(12) United States Patent
Duro-Emanuel et al.

(10) Patent No.: US 8,725,606 B2
(45) Date of Patent: May 13, 2014

(54) TERM NOTE PAIRED WITH A MONEY MARKET NOTE

(75) Inventors: Olaseni B. Duro-Emanuel, Jersey City, NJ (US); Diane M. Rinnovatore, Edison, NJ (US); Kent Peer-Nous, New York, NY (US); Michelle Suzanne Wernli, Hong Kong (HK); Konstantin Braun, Hoboken, NJ (US)

(73) Assignee: Barclays Capital Inc., New York, NY (US)

( * ) Notice: Subject to any disclaimer, the term of this patent is extended or adjusted under 35 U.S.C. 154(b) by 2284 days.

(21) Appl. No.: 10/645,060

(22) Filed: Aug. 21, 2003

(65) Prior Publication Data

US 2005/0044041 A1  Feb. 24, 2005

(51) Int. Cl.
*G06Q 40/00* (2012.01)
*G06Q 40/02* (2012.01)

(52) U.S. Cl.
CPC ..................... *G06Q 40/02* (2013.01)
USPC .............................. 705/35; 705/37

(58) Field of Classification Search
CPC ....................................... G06Q 40/02
USPC ..................................... 705/35–38
See application file for complete search history.

(56) References Cited

U.S. PATENT DOCUMENTS 5,689,649 A * 11/1997 Altman et al. ............. 705/36 R
6,032,134 A * 2/2000 Weissman ................. 705/40
2004/0015438 A1* 1/2004 Compiano et al. ......... 705/40
2004/0158479 A1* 8/2004 Adhikari ................... 705/1
2006/0112005 A1* 5/2006 Priore ........................ 705/39
2007/0100725 A1* 5/2007 Devito ..................... 705/36 R

OTHER PUBLICATIONS

S&P Assigns Ratings to White Pine and $20B Medium Term Note/CP Programs PR Newswire. New York: Feb 4, 2002. 3 pgs.*
Fitch IBCA Rates Secured Money Market Notes Backed by CMBS Business Editors. Business Wire. New York: Jul. 9, 1999. 2 pgs.*
A timely solution to liquidity management Corporate Finance. London: Apr. 2003. 5 pgs.*
Securitization—asset quality is the ticket for entry SG Australia. Asiamoney. London: Jul./Aug. 2000. 4 pgs.*
The Fundamentals of Asset-Backed Commercial Paper, Structured Finance Special Report, Moody's Investors Service, Feb. 9, 2003. 90 pgs.*
Fitch Rates Swift v1 Fltg Rate Asset-Backed Term Notes, Ser 2000-A, Business Wire, Jun. 30, 2000, Business Editors, New York.*
Structural and Collateral Considerations, Henry C. Albulescu. Securitization Conduit. Philadelphia: 2002. vol. 5, Iss 1-4.*
People Express Outlines New Debt Terms Required to Complete Sale to Texas Air, William M. Carley. Wall Street Journal. Eastern Edition. New York, Sep. 19, 1986.*
Reading the credit card fine print, Larry Getlen, Bankrate.com, Jan. 9, 2003.*

(Continued)

*Primary Examiner* — William Rankins
(74) *Attorney, Agent, or Firm* — Morgan Lewis & Bockius LLP

(57) ABSTRACT

There is provided an arrangement for a money market note and a term note. The arrangement includes (1) a provision for crediting (a) a collection to (b) principal of the money market note, if the principal of the money market note is not fully credited, and (2) a provision for crediting (a) the collection to (b) principal of the term note, if the principal of the money market note is fully credited.

30 Claims, 2 Drawing Sheets

(56) References Cited

OTHER PUBLICATIONS

The Fundamentals of Asset-Backed Commercial Paper, Bate et al., Moody's Investor Service, Feb. 3, 2003.*

Fitch IBCA Rates Secured Money Market Notes Backed by CMBS Business Editors. Business Wire. New York: Jul. 9, 1999.*

S&P Assigns Ratings to White Pine and $20B Medium Term Note/CP Programs PR Newswire. New York: Feb. 4, 2002.*

Securitization—asset quality is the ticket for entry SG Australia. Asiamoney. London: Jul./Aug. 2000.*

* cited by examiner

TERM NOTE PAIRED WITH A MONEY MARKET NOTE

BACKGROUND OF THE INVENTION

1. Field of the Invention

The present invention relates to financial securities, and more particularly, to an arrangement in which a collection of principal for a first financial instrument is allocated to a second financial instrument.

2. Description of the Related Art

In an overwhelming majority of asset-backed commercial paper (ABCP) programs that exist today, a 100% liquidity backstop is required by a rating agency to ensure that maturing commercial paper (CP) is repaid on its maturity date to a rated certainty (e.g., A-1+, A-1 or A-2, as applicable). The liquidity backstop is typically provided by a rated bank in the form of an unfunded cash commitment. To the extent that there is a disruption in the CP market and an issuer is unable to fund or refinance maturing ABCP by issuing new ABCP, that is, unable to roll the CP, the issuer will be forced to draw upon the liquidity commitment and use such funds to repay the maturing ABCP. The bank that provides such funding will then become an effective owner of an underlying asset supporting the ABCP program and rely on cash flows from the underlying asset for the repayment of the loan that the bank extended.

A problem for issuers of ABCP is that as the ABCP market has grown, the need for liquidity commitments from banks has grown, dollar for dollar, since these programs typically require $1 of liquidity commitment for every $1 of assets funded. As such, demand for bank-provided liquidity commitments has grown at a dramatically higher rate than supply. As a result, issuers of ABCP have been faced with a scarcity of bank-provided liquidity commitments and, where available, have had to pay significantly higher costs for obtaining these bank-provided liquidity commitments.

SUMMARY OF THE INVENTION

The present invention provides an alternative to bank provided liquidity that allows issuers of ABCP to seek liquidity directly from capital markets investors, at more advantageous pricing, rather than relying on the traditional bank market. A term note is coupled with a money market note, e.g., ABCP, to reallocate cash from the term note to the money market note.

The term note is a term asset-backed bond, i.e., having a maturity of 1 to 15 years, that reallocates cash flow of an underlying asset supporting it from a bondholder to a money market note holder during a period that the term note provides liquidity for the money market note. As such, an issuer of the term note relies on cash flows from its funded underlying assets, e.g., an account receivable, for providing liquidity to the money market note, as opposed to having to rely on a commitment from a bank.

There is described herein an arrangement for a money market note and a term note. The arrangement includes (1) a provision for crediting (a) a collection to (b) principal of the money market note, if the principal of the money market note is not fully credited, and (2) a provision for crediting (a) the collection to (b) principal of the term note, if the principal of the money market note is fully credited.

An embodiment of a money market note is also described. The money market note includes (1) a provision for crediting (a) a collection to (b) principal of the money market note, if the principal of the money market note is not fully credited, and (2) a provision for crediting (a) the collection to (b) principal of a term note, if the principal of the money market note is fully credited.

Another embodiment of a money market note includes a provision for crediting (a) a collection for principal of a term note to (b) principal of the money market note, if the principal of the money market note is not fully credited.

An embodiment of a term note is also described. The term note includes (1) a provision for crediting (a) a collection to (b) principal of a money market note, if the principal of the money market note is not fully credited, and (2) a provision for crediting (a) the collection to (b) principal of the term note, if the principal of the money market note is fully credited.

Another embodiment of a term note includes a provision for crediting (a) a collection for principal of the term note to (b) principal of a money market note, if the principal of the money market note is not fully credited.

There is also described herein a method involving a money market note and a term note. The method includes (1) crediting a collection to principal of the money market note, if the principal of the money market note is not fully credited, and (2) crediting the collection to principal of the term note, if the principal of the money market note is fully credited.

Another method involving a money market note and a term note includes crediting (a) a collection for principal of the term note to (b) principal of the money market note, if the principal of the money market note is not fully credited.

DESCRIPTION OF THE INVENTION

Before proceeding with a description of the present invention, it is well to define certain terms as used herein.

A "collection" is a receipt of a payment from a payor. The collection represents a transfer of money, but the transfer does not necessarily, literally, involve a movement of cash. The transfer may be represented by a journal entry, which in turn, may be represented in an electronic format, e.g., an electronic funds transfer.

A "credit" is an allocation of money to, or for the benefit of, an entity. In practice, the credit need not be accompanied by an actual movement of cash, but may be represented by a journal entry for an account, which in turn, may be represented in an electronic format.

"Interest" is a payment made by a borrower for the borrower's use of money.

"Interest rate" is a percentage of an amount of money that is paid for use of the money for a specified time.

"Principal" is a face value of a note, as distinguished from interest paid thereon.

Figure 1:
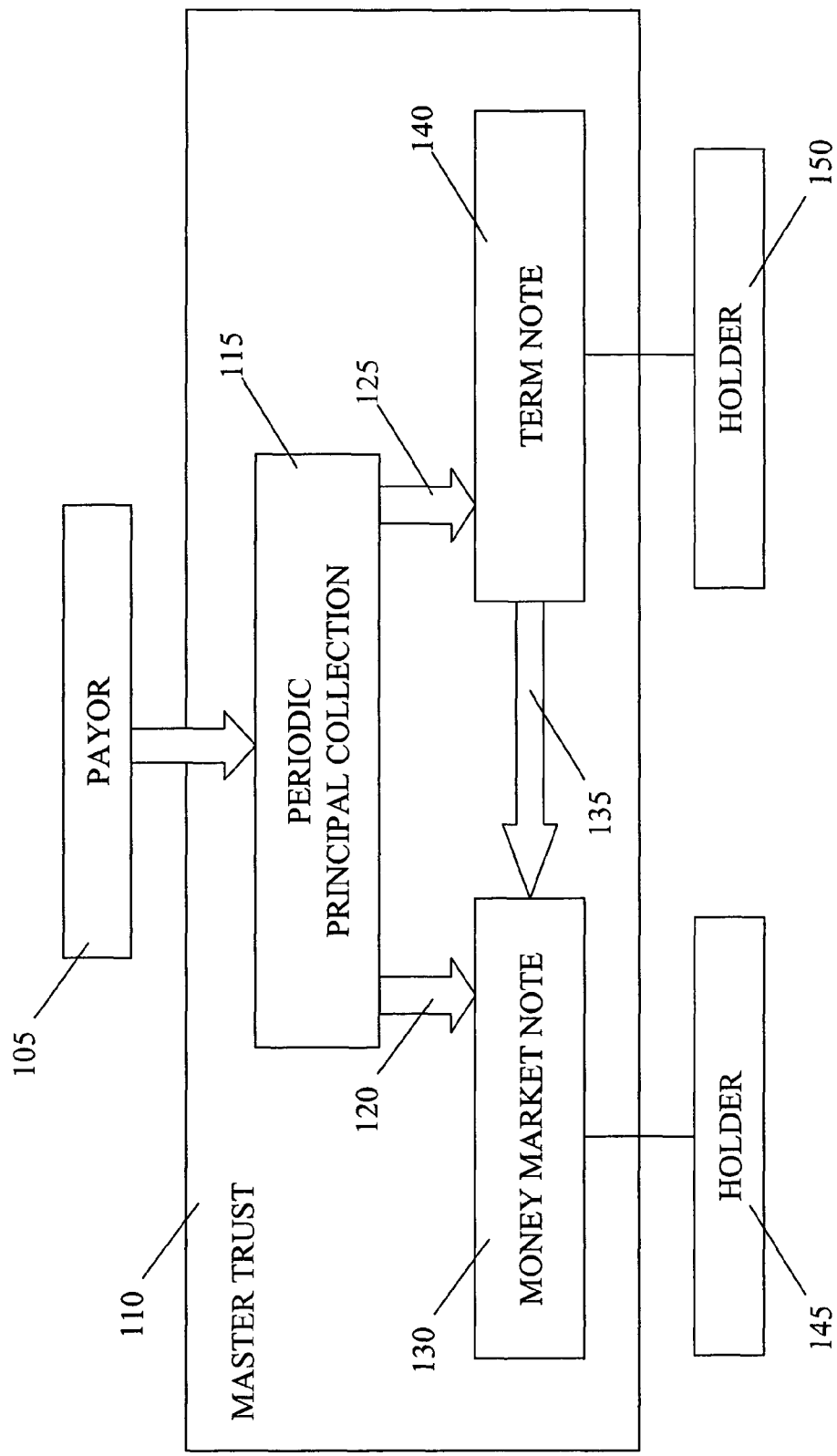
FIG. 1 is a functional block diagram of a case where principal of a money market note is not fully credited, and so, a collection is credited to principal of the money market note.
Figure 2:
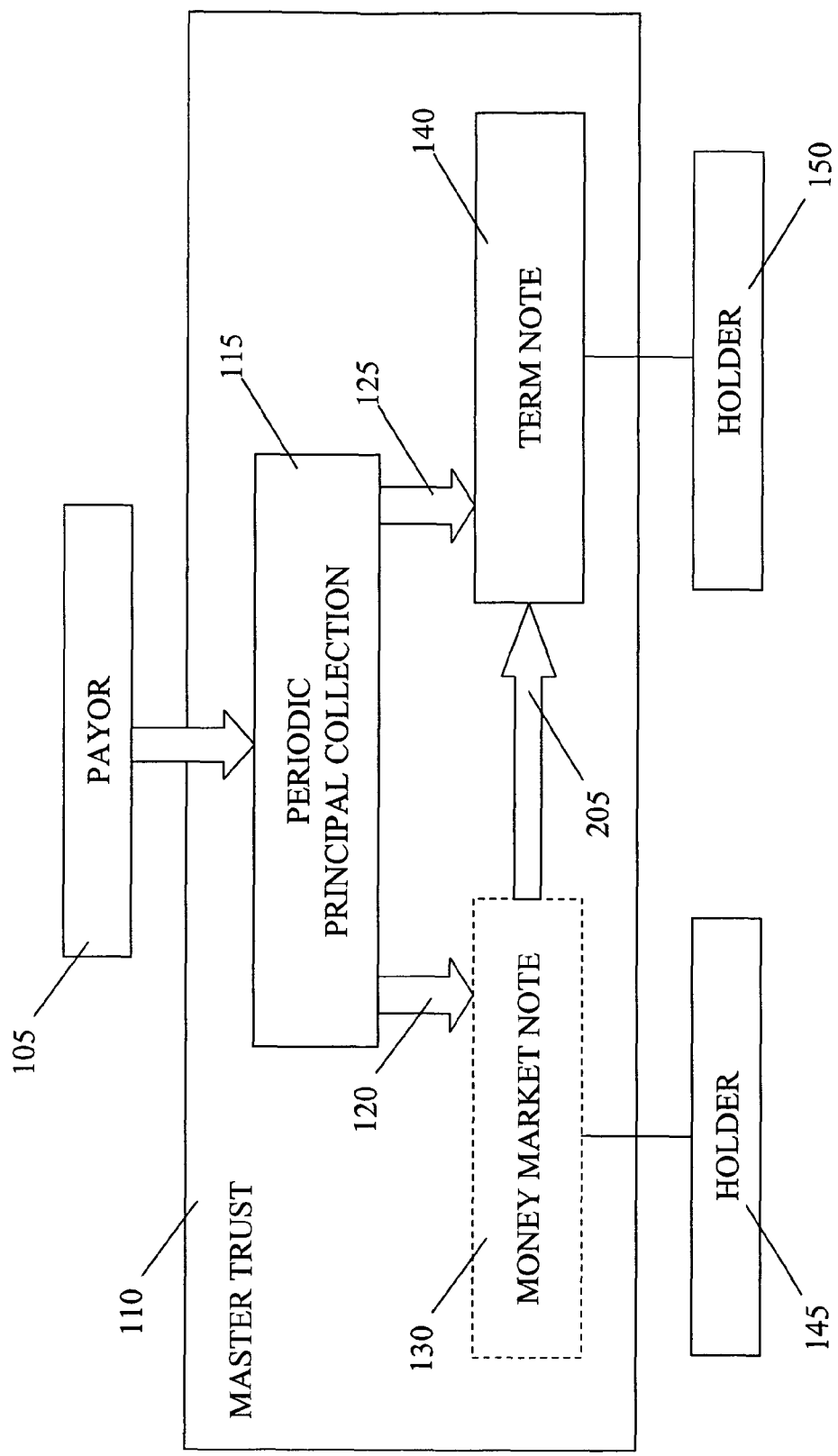
FIG. 2 is a functional block diagram of a case where principal of a money market note is fully credited, and so, a collection is credited to principal of a term note.

FIGS. 1 and 2 are block diagrams that, collectively, represent an arrangement between a term note 140 and a money market note 130. FIG. 1 shows a case where principal of money market note 130 is not fully credited, and so, a collection is credited to principal of money market note 130. FIG. 2 shows a case where principal of money market note 130 is fully credited, and so, a collection is credited to principal of term note 140.

Money market note 130 and term note 140 are financial securities. As such, they may be embodied in a tangible form, such as a certificate, or in an electronic form, such as a data record or file associated with an account. In any case, the arrangement described herein can be memorialized by provisions in, or otherwise associated with, money market note 130 and term note 140, or in a separate document or contract.

Money market note 130 has a maturity of less than or equal to 397 days, and is thus regarded as a short-term debt instrument. Examples of money market note 130 include commercial paper, extendible asset-backed commercial paper, and extendible asset-backed commercial paper securities. Commercial paper and extendible asset-backed commercial paper securities have maturities of less than or equal to 270 days while extendible asset-backed liquidity note securities have maturities of less than or equal to 397 days. The principal of money market note 130 is secured by an asset of the issuer of money market note 130, such as an account receivable. A holder 145 holds money market note 130.

Money market note 130 has a principal value. The principal of money market note 130 is considered fully credited when total collections credited to the principal of money market note 130 reduce its principal value to zero. Conversely, the principal of money market note 130 is not fully credited if the total collections credited to the principal of money market note 130 have not reduced its principal value to zero.

Term note 140 has a maturity of greater than 397 days. The principal of term note 140 is secured by an asset of the issuer of term note 140, such as an account receivable. One example of term note 140 is a 3-year asset backed bond. A holder 150 holds term note 140.

Master trust 110 is an entity that issues money market note 130 and term note 140, and thus, master trust 110 is a borrower of money as represented by money market note 130 and term note 140. As such, master trust 110 is obligated to repay principal, and also pay interest, for money market note 130 and term note 140, to holders 145 and 150, respectively. The asset that secures the principal of money market note 130 and the principal of term note 140 is owned by master trust 110.

Payor 105 is an obligor of the underlying asset. That is, payor 105 makes payments, typically periodic payments, to repay its obligation. Such payments are also known as collections, and are credited toward principal and interest of money market note 130 and term note 140.

A payment from payor 105 towards principal for money market note 130 and term note 140 is schematically represented as a periodic principal collection 115, which is held in a trust, e.g., master trust 110. A portion of collection 115 is for money market note 130 as indicated by a vector 120, and a portion is for term note 140 as indicated by a vector 125.

The arrangement for money market note 130 and term note 140 relates to use of funds that are ordinarily allocated for repayment of principal. The arrangement includes (1) a provision for crediting (a) collection 115 to (b) principal of money market note 130, if the principal of money market note 130 is not fully credited, and (2) a provision for crediting (a) collection 115 to (b) principal of term note 140, if the principal of money market note 130 is fully credited. In other words, collection 115 is credited first to the principal of money market 130, and collection 115 is credited to the principal of term note 140 only after the principal of money market note 130 is fully credited. The arrangement allows for a deferral of the repayment of the principal of term note 140.

Thus, an embodiment of money market note 130 includes (1) a provision for crediting (a) collection 115 to (b) the principal of money market note 130, if the principal of money market note 130 is not fully credited, and (2) a provision for crediting (a) collection 115 to (b) the principal of term note 140, if the principal of money market note 130 is fully credited.

An embodiment of term note 140 includes (1) a provision for crediting (a) collection 115 to (b) the principal of money market note 130, if the principal of money market note 130 is not fully credited, and (2) a provision for crediting (a) collection 115 to (b) the principal of term note 140, if the principal of money market note 130 is fully credited.

For example, assume that the original principal value for money market note 130 is $1000 and the original principal value for term note 140 is $250. Further assume that collection 115 is $500. In accordance with the arrangement, if the principal for money market note 130 is not yet fully credited, then $500 is available to credit the principal of money market note 130, and $0 is credited to the principal of term note 140. On the other hand, if the principal of money market note 130 has been fully credited, then $500 is available to credit term note 140.

Thus, a method involving money market note 130 and a term note 140 includes (1) crediting periodic principal collection 115 to the principal of money market note 130, if the principal of money market note 130 is not fully credited, and (2) crediting periodic principal collection 115 to the principal of term note 140, if the principal of money market note 130 is fully credited.

The arrangement has the effect of accelerating the repayment of the principal of money market note 130. For example, if the arrangement was not in place, then the $500 would be allocated based on the ratio of the original principal values (i.e., 1000:250), that is, $400 for the principal of money market note 130 and $100 for the principal of term note 140. Thus, if the arrangement was not in place, money market note 130 would be credited $400, whereas in accordance with the arrangement, money market note 130 is credited $500. $500 is 25% greater than $400. Therefore, the arrangement provides a 25% greater credit towards the principal of money market note 130, as compared to the credit that would be made in the absence of the arrangement.

After the principal of money market note 130 is fully credited, the repayment of the principal of term note 140 is accelerated. If the arrangement was not in place, then term note 140 would be credited $100, whereas in accordance with the arrangement, term note 140 is allocated $500 and $250 is credited. Note that although the entire $500 is allocated to term note 140 under this scenario, the maximum amount of principal that can be credited to term note 140 is $250, i.e., its original principal value. Nevertheless, $500 is 400% greater than $100. Therefore, the arrangement provides a 400% greater allocation towards the principal of term note 140, as compared to the allocation that would be made in the absence of the arrangement.

Crediting of collection 115 to money market note 130 can be made directly from collection 115, as indicated by vector 120. Likewise, the crediting of collection 115 to term note 140 can be made directly from collection 115 to term note 140, as indicated by vector 125. Alternatively, there may be an intermediate step in which collection 115 is first allocated between money market note 130 and term note 140, and then reallocated from term note 140 to money market note 130.

FIG. 1 shows a case where principal of money market note 130 is not fully credited, and so, a collection, represented by a vector 135, is credited from term note 140 to principal of money market note 130. Conversely, FIG. 2 shows a case where principal of money market note 130 has been fully credited, and as such, money market note 130 no longer exists. Consequently, a collection 120 that would be credited to money market note 130 if it still existed is instead credited to principal of term note 140, as represented by a vector 205.

Thus, another embodiment of money market note 130 includes a provision for crediting (a) a collection for the principal of term note 140 to (b) the principal of money market note 130, if the principal of money market note 130 is not fully credited. That is, if money market note 130 is not fully credited, money market note 130 is entitled to the collection that is initially allocated to term note 140. Similarly, another embodiment of term note 140 includes a provision for crediting (a) a collection for the principal of term note 140 to (b) the principal of money market note 130, if the principal of money market note 130 is not fully credited. Thus, a method involving money market note 130 and term note 140 includes crediting (a) a collection for the principal of term note 140 to (b) principal of money market note 130, if the principal of money market note 130 is not fully credited.

For example, refer to FIG. 1, and again assume collection 115 includes $500 that is allocated as $400 for the principal of money market note 130 and $100 for the principal of term note 140. In the case where the principal for money market note 130 is not fully credited, the $100 for the principal of term note 140 is credited to the principal of money market note 130, and thus reallocated from term note 140 to money market note 130, as indicated by vector 135.

Refer now to FIG. 2, which illustrates the case where the principal for money market note 130 is fully credited. As such, money market note 130 no longer exists and is not entitled to any further collections of principal, and so it is represented with a dashed outline. Nevertheless, conceptually, any collection that would have gone towards the principal of money market note 130 is reallocated to the principal of term note 140, as represented by vector 205. As the principal of money market note is fully credited, the collection is credited to the principal of term note 140, as represented by vector 205.

Another aspect of term note 140 is that it includes a provision for term note 140 to receive interest at an interest rate during a term period. It also includes a provision for extending the term period for an extended term period, if the principal of term note 140 is not fully credited by the expiration of the term period. Additionally, term note 140 includes a provision for increasing the interest rate during the extended term period. For example, assume term note 140 receives interest at a rate of 4% during a term period of 2 years. If at the expiration of the 2 year period, the principal of term note 140 is not fully credited, then the term period is extended, say, for an extension of 1 additional year, and the interest rate is stepped up to 5%.

Master trust 110 is a securitization vehicle. Note that the arrangement described herein, and more specifically, the coupling of term note 140 with money market note 130, makes efficient use of cash in master trust 110. That is, when it receives a collection for the principal of term note 140, it utilizes the collection to pay down the principal of money market note 130, rather than holding the collection, dormant, for the eventual repayment of the principal of term note 140. Thus, master trust 110 avoids paying, or at least reduces an amount of, a commitment fee to a bank for a traditional bank liquidity line.

Furthermore, utilization of term note 140 provides an incremental cost saving over the traditional bank liquidity line. Term note 140 serves dual purposes of providing term funding and providing term liquidity for master trust 110. Utilization of term note 140 also reduces renewal and re-pricing risks associated with 364-day facilities since term note 140 provides multi-year liquidity up front.

It should be understood that various alternatives and modifications could be devised by those skilled in the art. The present invention is intended to embrace all such alternatives, modifications and variances that fall within the scope of the appended claims.

What is claimed is:

1. A system comprising:
   memory operable to store at least one program; and
   at least one processor communicatively coupled to the memory, in which the at least one program, when executed by the at least one processor, causes the at least one processor to perform a method comprising: providing liquidity to a financial transaction in which a term note and a money market note are issued by, upon receiving a payment for principal of the term note, crediting the payment to principal of the money market note if the principal of the money market note is not fully credited, and crediting the payment to principal of the term note if the principal of the money market note is fully credited, wherein the term note and the money market note have a same credit risk rating.

2. The system of claim 1 wherein the payment is held by a trust.

3. The system of claim 1 wherein the principal of the money market note and the principal of the term note are secured by an asset.

4. The system of claim 3 wherein the asset is an account receivable.

5. The system of claim 1 wherein the money market note is selected from the group consisting of commercial paper, extendible asset-backed commercial paper and an extendible asset-backed liquidity note.

6. The system of claim 1 wherein the term note comprises a provision to receive interest at an interest rate during a term period.

7. The system of claim 6 wherein the term note further comprises a provision for extending the term period for an extended term period if the principal of the term note is not fully credited by an expiration of the term period.

8. The system of claim 7 wherein the term note further comprises a provision for increasing the interest rate during the extended term period.

9. A system comprising:
   memory operable to store at least one program; and
   at least one processor communicatively coupled to the memory, in which the at least one program, when executed by the at least one processor, causes the at least one processor to perform a method comprising:
   providing liquidity to a financial transaction in which a term note is issued and a money market note is held, wherein the money market note and the term note have a same credit risk rating, and wherein a payment for principal of the term note is credited to principal of the money market note if the principal of the money market note is not fully credited and the payment for principal of the term note is credited to principal of the term note if the principal of the money market note is fully credited.

10. The system of claim 9 wherein the payment is held by a trust.

11. The system of claim 9 wherein the principal of the money market note and the principal of the term note are secured by an asset.

12. The system of claim 11 wherein the asset is an account receivable.

13. The system of claim 9 wherein the money market note is selected from the group consisting of commercial paper, extendible asset-backed commercial paper and an extendible asset-backed liquidity note.

14. The system of claim 9 wherein the term note comprises a provision to receive interest at an interest rate during a term period.

15. The system of claim 14 wherein the term note further comprises a provision for extending the term period for an extended teen period if the principal of the term note is not fully credited by an expiration of the term period.

16. The system of claim 15 wherein the term note further comprises a provision for increasing the interest rate during the extended term period.

17. A system comprising:
memory operable to store at least one program; and
at least one processor communicatively coupled to the memory, in which the at least one program, when executed by the at least one processor, causes the at least one processor to perform a method comprising:
providing liquidity to a financial transaction in which a money market note is issued and a term note is held, wherein the money market note and the term note have a same credit risk rating, and wherein a payment for principal of the term note is credited to principal of the money market note if the principal of the money market note is not fully credited and the payment for principal of the term note is credited to principal of the term note if the principal of the money market note is fully credited.

18. The system of claim 17 wherein the payment is held by a trust.

19. The system of claim 17 wherein the principal of the money market note and the principal of the term note are secured by an asset.

20. The system of claim 19 wherein the asset is an account receivable.

21. The system of claim 19 wherein the money market note is selected from the group consisting of commercial paper, extendible asset-backed commercial paper and an extendible asset-backed liquidity note.

22. The system of claim 19 wherein the term note comprises a provision to receive interest at an interest rate during a term period.

23. The system of claim 22 wherein the term note further comprises a provision for extending the term period for an extended term period if the principal of the term note is not fully credited by an expiration of the term period.

24. The system of claim 23 wherein the term note further comprises a provision for increasing the interest rate during the extended term period.

25. A non-transitory computer readable storage medium having stored thereon computer executable instructions that, when executed on a computer, configure the computer to perform a method comprising:
providing liquidity to a financial transaction in which a term note and a money market note are issued by, upon receiving a payment for principal of the term note, crediting the payment to principal of the money market note if the principal of the money market note is not fully credited, and crediting the payment to principal of the term note if the principal of the money market note is fully credited, wherein the term note and the money market note have a same credit risk rating.

26. A non-transitory computer readable storage medium having stored thereon computer executable instructions that, when executed on a computer, configure the computer to perform a method comprising:
providing liquidity to a financial transaction in which a term note is issued and a money market note is held, wherein the money market note and the term note have a same credit risk rating, and wherein a payment for principal of the term note is credited to principal of the money market note if the principal of the money market note is not fully credited and the payment for principal of the term note is credited to principal of the term note if the principal of the money market note is fully credited.

27. A non-transitory computer readable storage medium having stored thereon computer executable instructions that, when executed on a computer, configure the computer to perform a method comprising:
providing liquidity to a financial transaction in which a money market note is issued and a term note is held, wherein the money market note and the term note have a same credit risk rating, and wherein a payment for principal of the term note is credited to principal of the money market note if the principal of the money market note is not fully credited and the payment for principal of the term note is credited to principal of the term note if the principal of the money market note is fully credited.

28. A computer-implemented method comprising:
providing liquidity to a financial transaction in which a term note and a money market note are issued by, upon receiving a payment for principal of the term note, electronically crediting the payment to principal of the money market note, using a computer, if the principal of the money market note is not fully credited, and electronically crediting the payment to principal of the term note, using the computer, if the principal of the money market note is fully credited, wherein the term note and the money market note have a same credit risk rating.

29. A computer-implemented method comprising:
providing liquidity to a financial transaction in which a term note is issued and a money market note is held, wherein the money market note and the term note have a same credit risk rating, and wherein a payment for principal of the term note is electronically credited to principal of the money market note, using a computer, if the principal of the money market note is not fully credited, and the payment for principal of the term note is electronically credited to principal of the term note, using the computer, if the principal of the money market note is fully credited.

30. A computer-implemented method comprising:
providing liquidity to a financial transaction in which a money market note is issued and a term note is held, wherein the money market note and the term note have a same credit risk rating, and wherein a payment for principal of the term note is electronically credited to principal of the money market note, using a computer, if the principal of the money market note is not fully credited, and the payment for principal of the term note is electronically credited to principal of the term note, using a computer, if the principal of the money market note is fully credited.

* * * * *